(12) United States Patent
Lee et al.

(10) Patent No.: US 8,952,924 B2
(45) Date of Patent: Feb. 10, 2015

(54) CAPACITIVE TOUCH PANEL

(75) Inventors: Ming-Shian Lee, Nantou County (TW); Yu-Chen Liu, Taipei (TW)

(73) Assignees: Dongguan Masstop Liquid Crystal Display Co., Ltd., Guangdong Province (CN); Wintek Corporation, Taichung (TW)

( * ) Notice: Subject to any disclaimer, the term of this patent is extended or adjusted under 35 U.S.C. 154(b) by 290 days.

(21) Appl. No.: 13/366,365

(22) Filed: Feb. 6, 2012

(65) Prior Publication Data

US 2012/0212448 A1    Aug. 23, 2012

(30) Foreign Application Priority Data

Feb. 23, 2011   (TW) .............................. 100106043 A (51) Int. Cl.
   *G06F 3/044*    (2006.01)
(52) U.S. Cl.
   CPC ...... *G06F 3/044* (2013.01); *G06F 2203/04111* (2013.01)
   USPC ......................................................... 345/174
(58) Field of Classification Search
   None
   See application file for complete search history.

(56) References Cited

U.S. PATENT DOCUMENTS

| | | | |
|---|---|---|---|
| 2007/0008299 A1 | 1/2007 | Hristov | |
| 2007/0279395 A1* | 12/2007 | Philipp et al. ................. | 345/173 |
| 2009/0002337 A1* | 1/2009 | Chang ........................... | 345/174 |
| 2009/0166100 A1* | 7/2009 | Matsubara ................. | 178/18.06 |
| 2010/0079393 A1 | 4/2010 | Dews | |
| 2010/0301879 A1 | 12/2010 | Philipp | |
| 2011/0025639 A1* | 2/2011 | Trend et al. ................... | 345/174 |
| 2011/0279405 A1* | 11/2011 | Meng ............................. | 345/174 |
| 2012/0182230 A1* | 7/2012 | Wang et al. ................... | 345/173 |

FOREIGN PATENT DOCUMENTS

| | | |
|---|---|---|
| CN | 101923419 | 12/2010 |
| TW | 200805128 | 1/2008 |
| TW | 201027409 | 7/2010 |
| TW | 201101135 | 1/2011 |

OTHER PUBLICATIONS

"Office Action of Taiwan Counterpart Application", issued on Nov. 8, 2013, p. 1-p. 7.

* cited by examiner

*Primary Examiner* — Adam R Giesy
(74) *Attorney, Agent, or Firm* — Jianq Chyun IP Office (57) ABSTRACT

A capacitive touch panel including a substrate, first sensing series, second sensing series, and a first insulation layer is provided. Each first sensing series is disposed on the substrate and includes first sensing electrodes and first auxiliary electrodes. Each first auxiliary electrodes has a first connection terminal connected with one of the first sensing electrodes and a first open terminal away form the correspondingly first sensing electrode. Each second sensing series is disposed on the substrate and the first sensing series and includes second sensing electrodes. The first sensing series and the second sensing series are electrically insulated with each other. An edge of each second sensing electrode is conformed to an edge of the adjacent first sensing series.

13 Claims, 12 Drawing Sheets

CAPACITIVE TOUCH PANEL

CROSS-REFERENCE TO RELATED APPLICATION

This application claims the priority benefit of Taiwan application serial no. 100106043, filed on Feb. 23, 2011. The entirety of the above-mentioned patent application is hereby incorporated by reference herein and made a part of this specification.

BACKGROUND OF THE INVENTION

1. Field of the Invention

The invention relates to a touch panel, and more particularly, to a capacitive touch panel.

2. Description of Related Art

Figure 1:
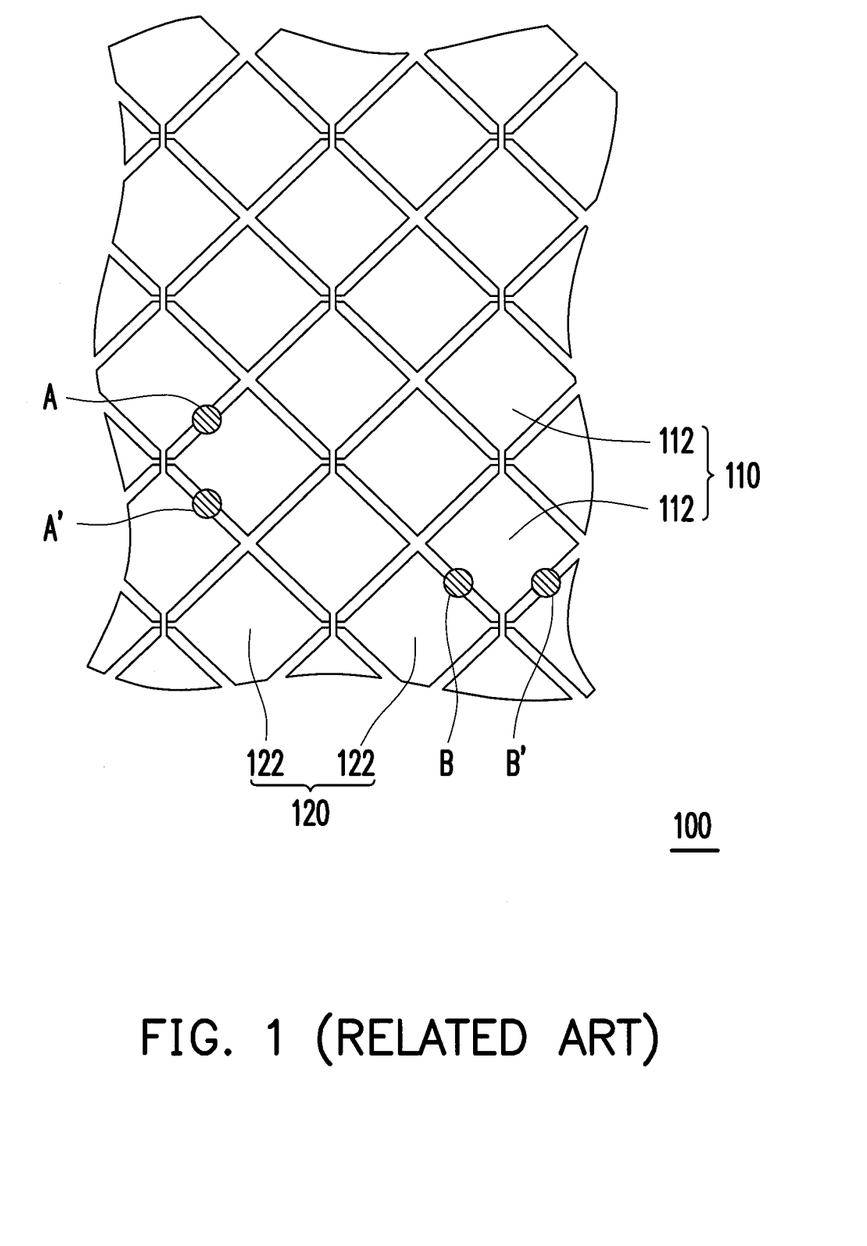
FIG. 1 illustrates a schematic top view of a conventional capacitive touch panel.

Referring to FIG. 1, a capacitive touch panel 100 includes a first sensing series 110 and a second sensing series 120, wherein the first sensing series 110 and the second sensing series 120 are formed by serially connecting a plurality of first sensing electrodes 112 and serially connecting a plurality of second sensing electrodes 122, respectively.

In the capacitive touch panel 100, a sensing error can be generated when an area of a touch point is smaller than an area of a single sensing electrode. Specifically, in a same second sensing series 120, the sensed signal value generated by the touch point A is identical to the sensed signal value generated by the touch point A'. Accordingly, the touch point A' may be incorrectly determined as the point being touched when the touch point A is the true point being touched and vise versa. The sensed signal value generated by the touch point A is identical to the sensed signal value generated by the touch point A' so that the touch point A can be the ghost point of the touch point A' and the touch point A' can be the ghost point of the touch point A. Alternately, in the first sensing series 110, the sensed signal value generated by the touch point B is identical to the sensed signal value generated by the touch point B' so that the touch point B can be the ghost point of the touch point B' and the touch point B' can be the ghost point of the touch point B.

SUMMARY OF THE INVENTION

The invention provides a capacitive touch display panel to avoid from a sensing error by disposing an auxiliary electrode.

The invention provides a capacitive touch panel including a substrate, a plurality of first sensing series, a plurality of second sensing series, and a first insulation layer. The first sensing series is disposed on the substrate. Each of the first sensing series extends in a first direction and includes a plurality of first sensing electrodes and a plurality of first auxiliary electrodes. The first sensing electrodes are serially connected in the first direction. Each of the first auxiliary electrodes has a first connection terminal and a first open terminal opposite to the first connection terminal. The first connection terminal is connected with one of the first sensing electrodes, and the first open terminal is away from the corresponding first sensing electrode. The second sensing series is disposed on the first sensing series and the substrate. Each of the second sensing series extends in a second direction so as to interlace with the first sensing series and includes a plurality of second sensing electrodes serially connected in the second direction. The second sensing electrodes and the first sensing electrode are electrically insulated with each other and an edge of each second sensing electrode is substantially conformal to an edge of the adjacent first sensing series.

In light of the foregoing descriptions, each of the first sensing electrodes according to the capacitive touch panel of the invention is connected with a first auxiliary electrode and the open terminal of the first auxiliary electrode is away from the first sensing electrode connected thereto. Accordingly, the signal values of different touch points are prevent from being identical by disposing the first auxiliary electrode, which is conducive to avoid from a sensing error of the touch point.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the exemplary embodiments of the invention, examples of which are illustrated in the accompanying drawings. Moreover, elements/components/notations with same reference numerals represent same or similar parts in the drawings and embodiments. Furthermore, the terminology of "first" and "second" used in the following embodiments merely represents similar elements but is not intended to limit the formation sequence of the elements.

First Embodiment

Figure 2A:
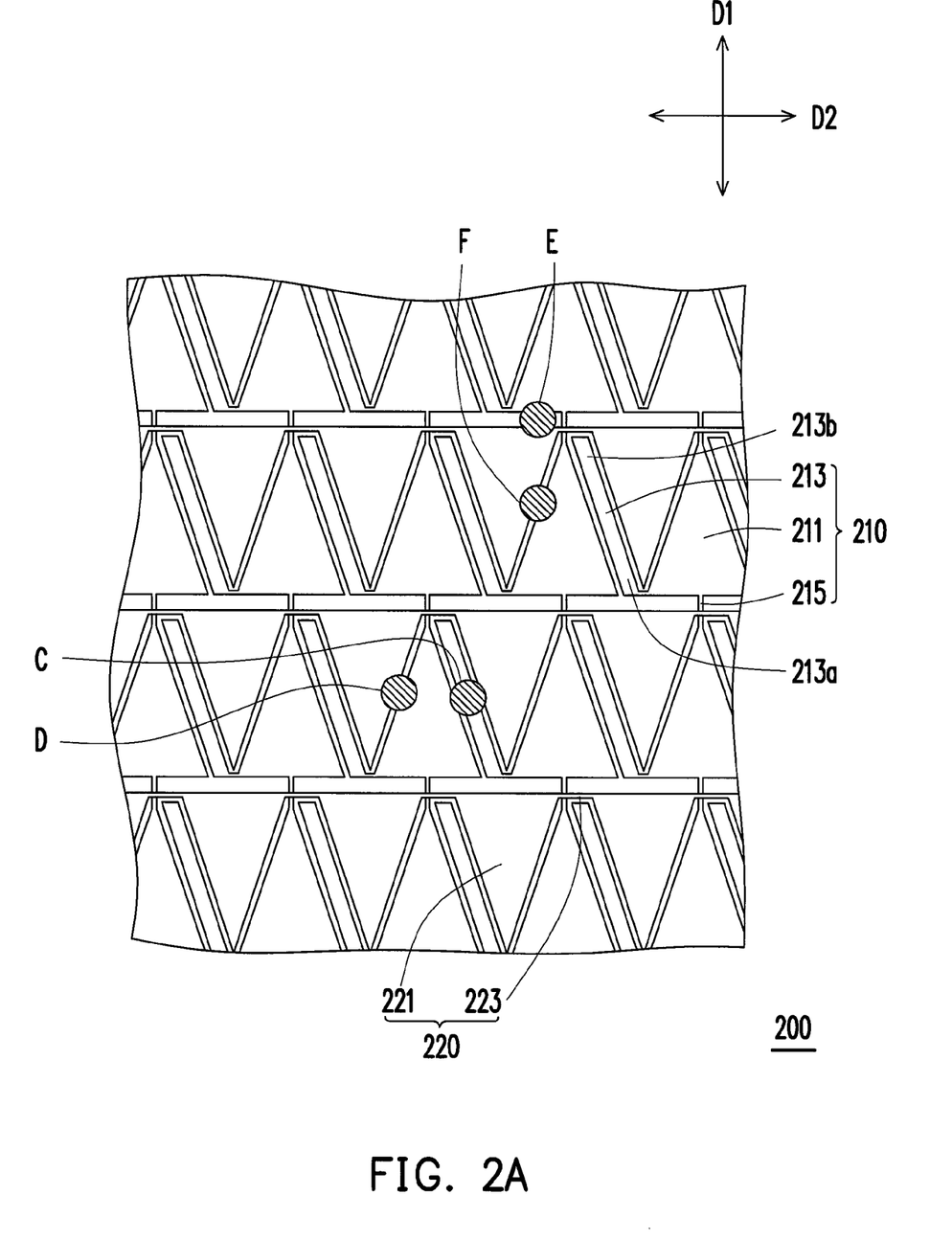
FIG. 2A illustrates a schematic top view of a portion of a capacitive touch panel according to a first embodiment of the invention.

Referring to FIG. 2A, in the present embodiment, a capacitive touch panel is a projected capacitive touch panel, for instance. The capacitive touch panel 200 at least includes a plurality of first sensing series 210 extending in a first direction D1 and a plurality of second sensing series 220 extending in a second direction D2. Each of the first sensing series 210 includes a plurality of first sensing electrodes 211, a plurality of first auxiliary electrodes 213, and a plurality of first connection lines 215. Each of the second sensing series 220 includes a plurality of second sensing electrodes 221 and a plurality of second connection lines 223.

The first connection lines 215 serially connect the first sensing electrodes 211 in the first direction D1. Each of the first auxiliary electrodes 213 has a first connection terminal 213a and a first open terminal 213b. The first connection terminal 213a of the first auxiliary electrode 213 is connected with the corresponding first sensing electrode 211 and the first open terminal 213b of the first auxiliary electrode 213 is away from the first sensing electrode 211 connected thereto. The second connection lines 223 serially connect the second sensing electrodes 221 in the second direction D2. Each of the first sensing electrodes 211 is not overlapped with the adjacent second sensing electrodes 221. In addition, the first sensing series 210 are electrically insulated from the second sensing series 220.

The first sensing electrode 211 is a triangular electrode, for example, in the present embodiment and the first auxiliary electrode 213 is a stripe electrode.

As shown in FIG. 2A, the first auxiliary electrode 213 is substantially directly adjacent to the edge of one first sensing electrode 211 in another adjacent first sensing series 210 and the edge of the first auxiliary electrode 213 is substantially conformal to the edge of the first sensing electrode 211 adjacent thereto. The second sensing electrode 221 is a triangular electrode filled in the area between the first sensing electrode 211 and the first auxiliary electrode 213.

Based on the foregoing descriptions, the sensed signal value generated by the touch point C is different from the sensed signal value generated by the touch point D, which is conducive to prevent the signals generated by the touch points located at the left side and the right side of one first sensing series 210 in the capacitive touch panel 200 from being indistinguishable and further avoid from the sensing error. Similarly, the sensed signal values generated at the touch point E and the touch point F are different, which is conducive to prevent the signals generated by the touch points located at the upper side and the bottom side of one second sensing series in the capacitive touch panel 200 from being indistinguishable and further avoid from the sensing error.

In the present embodiment, the lower limitation of the width of the stripe electrode can be determined based on the ability of the driving circuit corresponding to the capacitive touch panel 200 such as the signal-to noise ratio (SNR). Namely, the better the ability of the driving circuit corresponding to the capacitive touch panel 200, the thinner the widths of the first auxiliary electrodes 213. The poor the ability of the driving circuit corresponding to the capacitive touch panel 200, the thicker the widths of the first auxiliary electrodes 213. Furthermore, the first auxiliary electrode 213 is a stripe electrode in the present application, but the first auxiliary electrode 213 can be formed in other shapes such as a trapezoid, a zigzag shape, or an irregular shape in other embodiments.

The following embodiment illustrate the cross-sectional views of the capacitive touch panel depicted in FIG. 2A.

Figure 2B:
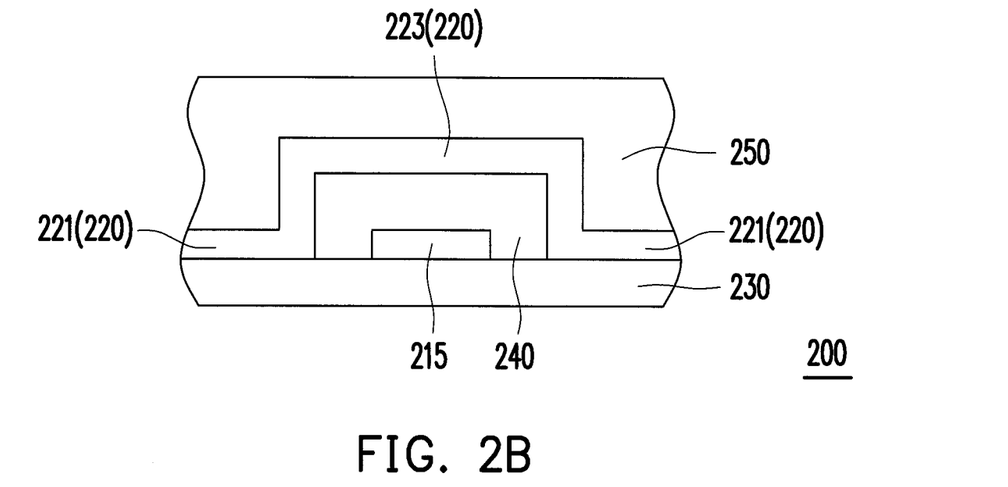
FIG. 2B illustrates a first design of a cross-sectional view of the capacitive touch panel depicted in FIG. 2A.

Referring to the first design depicted in FIGS. 2A and 2B simultaneously, in addition to the first sensing series 210 and the second sensing series 220, the capacitive touch panel 200 further includes a substrate 230, a first insulation layer 240, and a second insulation layer 250. The material of the first connection lines 215 and the second connection lines 223 can be metal or a transparent conductive material. The method for fabricating the capacitive touch panel according to the present embodiment can include fabricating the first connection lines 215 on the substrate 230. Next, the insulation layer 240 having island patterns is formed. Thereafter, the first sensing electrodes 211, the first auxiliary electrodes 213, and the second sensing series 220 are simultaneously formed such that the first sensing electrodes 211 and the first auxiliary electrodes 213 can be co-planar to the second sensing electrodes 221 in the second sensing series 220.

Figure 2C:
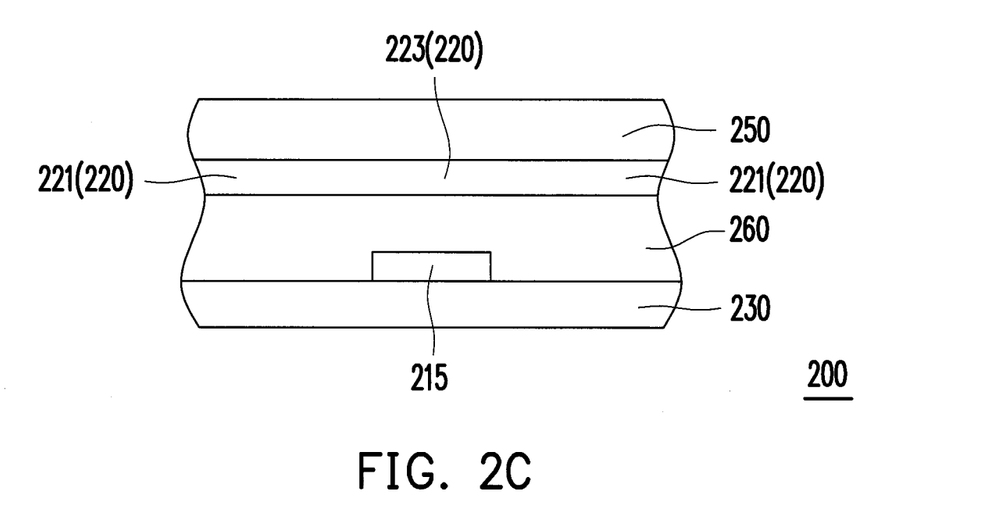
FIG. 2C illustrates a second design of a cross-sectional view of the capacitive touch panel depicted in FIG. 2A.

Referring to FIG. 2A and FIG. 2C together, the difference from the second design depicted in the present embodiment and the foregoing one lies in that the first insulation layer 260 in FIG. 2C is a formed by a layer-like insulation material. The method for fabricating the capacitive touch panel of the present embodiment can include first forming the first sensing series 210, wherein the drawing of FIG. 2C merely shows the first connection lines 215 of the first sensing series 210. Thereafter, the second insulation layer 260 is formed. Next, the second sensing series 220 including the second sensing electrodes 221 and the second connection lines 223 are fabricated such that the first sensing series 210 and the second sensing series 220 are respectively located at two opposite sides of the insulation layer 260.

Figure 2D:
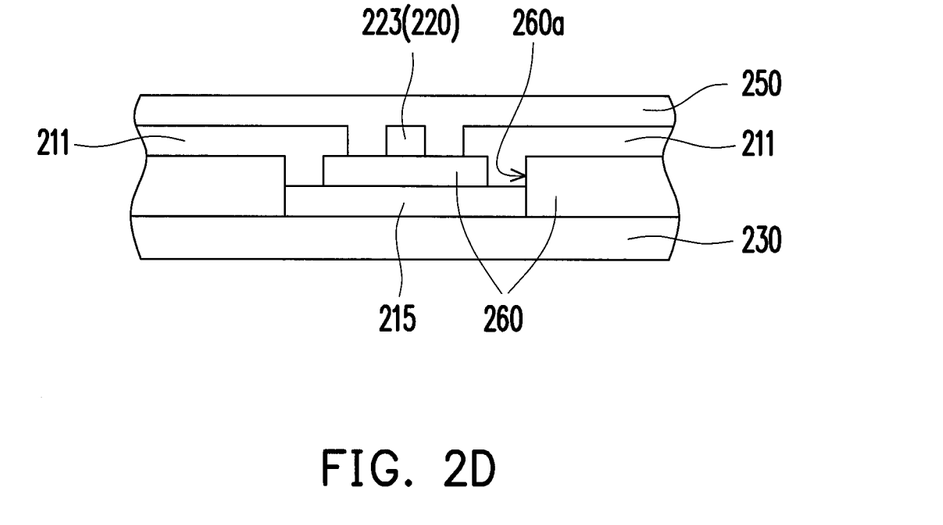
FIG. 2D illustrates a third design of a cross-sectional view of the capacitive touch panel depicted in FIG. 2A.

Referring to FIG. 2A and FIG. 2D simultaneously, in the third design of the present embodiment, the first connection lines 215 are first formed on the substrate 230 and the insulation layer 260 is subsequently formed. Thereafter, a plurality of contact openings 260a are formed in the insulation layer 260 to exposed terminals of the first connection lines 215 and the second sensing series 220 (the drawing of FIG. 2D merely shows the second connection lines 223 of the second sensing series 220) and the first sensing electrodes 211 are formed on the insulation layer 260, wherein the first sensing electrodes 221 are connected with the first connection lines 215 through the contact openings 260a. Accordingly, the first sensing electrodes 211 may be co-planar with the second sensing electrodes 221.

Second Embodiment

Figure 3:
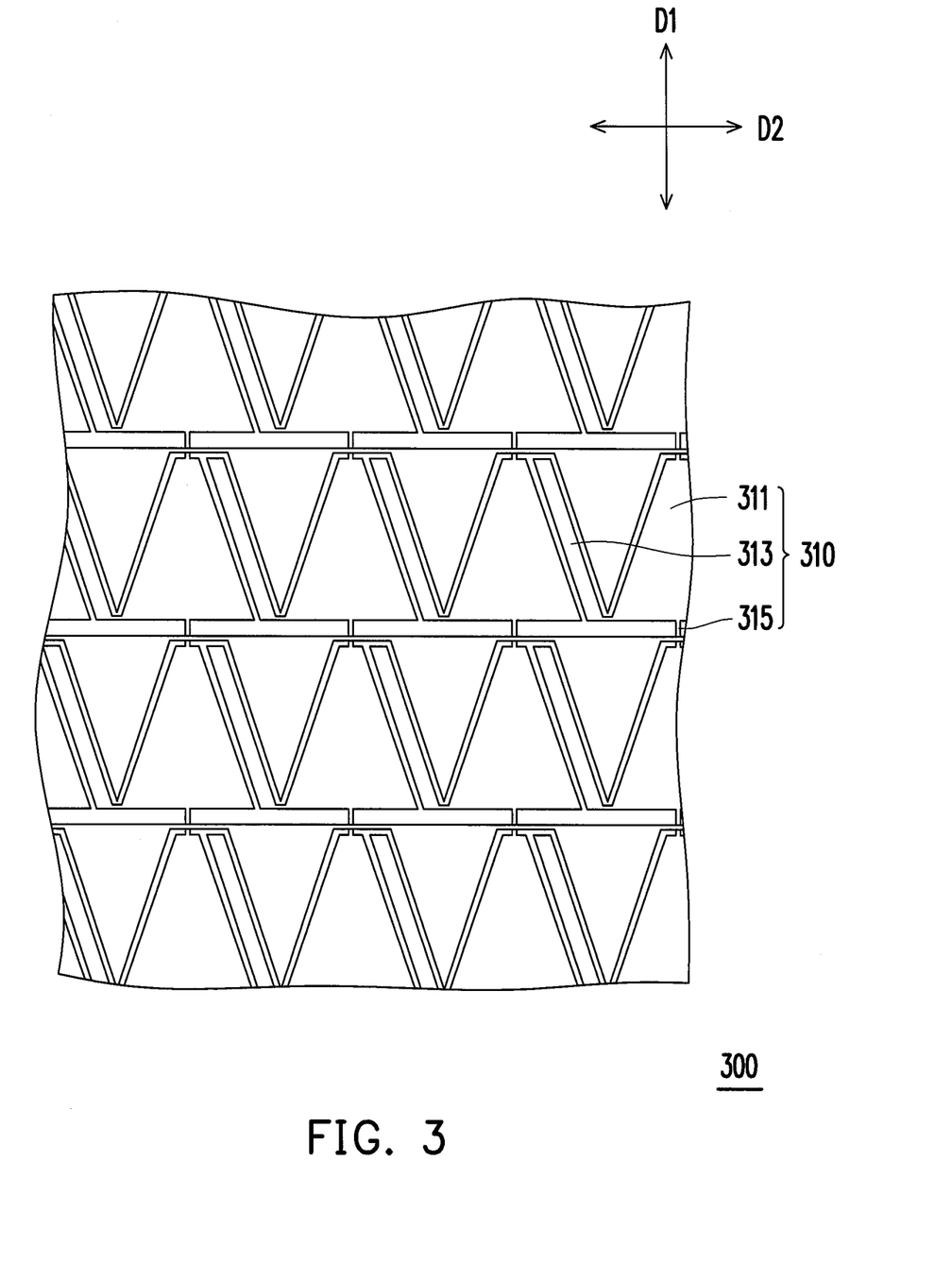
FIG. 3 illustrates a schematic top view of a portion of a capacitive touch panel according to a second embodiment of the invention.

Referring to FIG. 2A and FIG. 3 simultaneously, the capacitive touch panel 300 is similar to the capacitive touch panel 200 and the difference therebetween lies in that the first sensing electrode 311 in the capacitive touch panel 300 has a trapezoid shape. The first auxiliary electrodes 313 and the first connection lines 315 of the first sensing series 310 can be referred to the first auxiliary electrodes 213 and the first connection lines 215 of the capacitive touch panel 200 and the detail is not repeated again.

Third Embodiment

Figure 4:
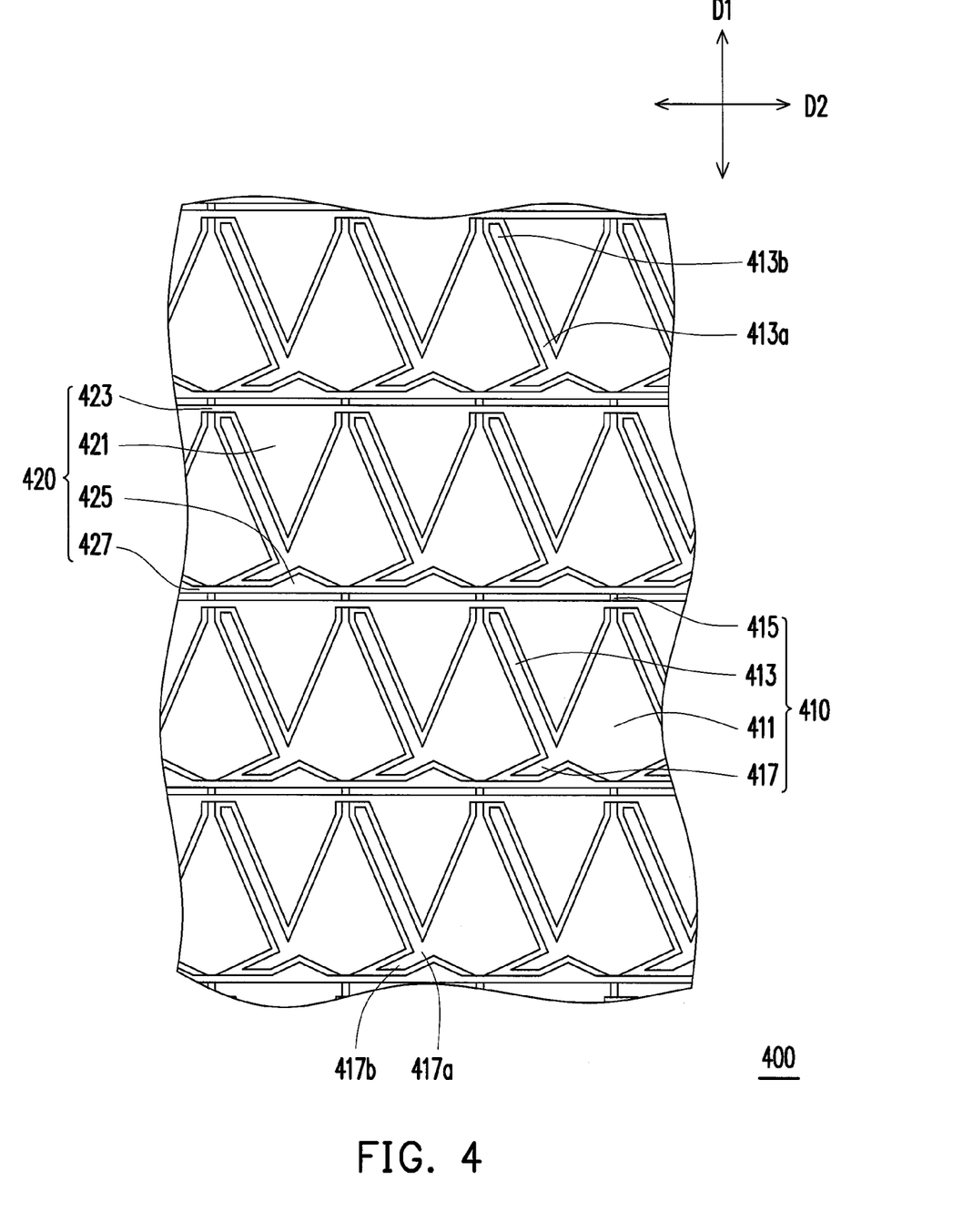
FIG. 4 illustrates a schematic top view of a portion of a capacitive touch panel according to a third embodiment of the invention.

Referring to FIG. 4, in the capacitive touch panel 400, each of the first sensing series 410 includes a plurality of first sensing electrodes 411, a plurality of first auxiliary electrodes 413 and 417, and a plurality of first connection lines 415. Each of the second sensing series 420 includes a plurality of second sensing electrodes 421, a plurality of second connection lines 423, a plurality of third sensing electrodes 425, and a plurality of third connection lines 427. The first connection lines 415 serially connect the first sensing electrodes 411 in the first direction D1. The second connection lines 423 serially connect the second sensing electrodes 421 in the second direction D2. The third connection lines 427 serially connect the third sensing electrodes 425 in the second direction D2. Each of the third sensing electrodes 425 can be opposite to one of the second sensing electrodes 421.

The first connection terminals 413a of the first auxiliary electrodes 413 are connected with the corresponding first sensing electrodes 411 and the first open terminals 413b of the first auxiliary electrodes 413 are away from the first sensing electrodes 411 connected thereto. The first connection terminals 417a of the first auxiliary electrodes 417 are connected with the corresponding first sensing electrodes 411. In one embodiment, the first connection terminals 417a of the first auxiliary electrodes 417 can be selectively connected with the first connection terminals 413a of the first auxiliary electrodes 413. Alternately, the first connection terminals 417a and the first connection terminals 413a can be respectively connected with the first sensing electrode 411. The first open terminal 417b of the first auxiliary electrode 417 is away from the first sensing electrode 411 connected thereto and the first open terminal 417b of the first auxiliary electrode 417 and the first open terminal 413b of the first auxiliary electrode 413 point toward different directions.

The first sensing electrode 411 is a kite-like electrode, for example, in the present embodiment and the first auxiliary electrodes 413 and the first auxiliary electrodes 417 are stripe-like electrodes. The first auxiliary electrode 413 is substantially adjacent to the edge of one first sensing electrode 411 in the directly adjacent first sensing series 410 and the edge of the first auxiliary electrodes 413 and 417 are substantially conformal to the edge of the first sensing electrode 411 adjacent thereto. Furthermore, the second sensing electrodes 421 and the third sensing electrodes 425 are triangular electrodes with different areas. The patterns of the second sensing electrodes 421 and the third sensing electrodes 425 substantially complement the patterns constructed by the first sensing electrodes 411, the first auxiliary electrodes 413, and the first auxiliary electrodes 417, for example. The edges of the second sensing electrodes 421 are substantially conformal to the edges of the adjacent first sensing electrode 411 and the adjacent first auxiliary electrodes 413. The edges of the third sensing electrodes 425 are substantially conformal to the edges of the adjacent first sensing electrode 411 and the adjacent first auxiliary electrodes 417. In addition, in a same second sensing series 410, at least one second sensing electrode 421 is connected with the corresponding third sensing electrode 425 for achieving one series to be electrically connected together.

Fourth Embodiment

Figure 5:
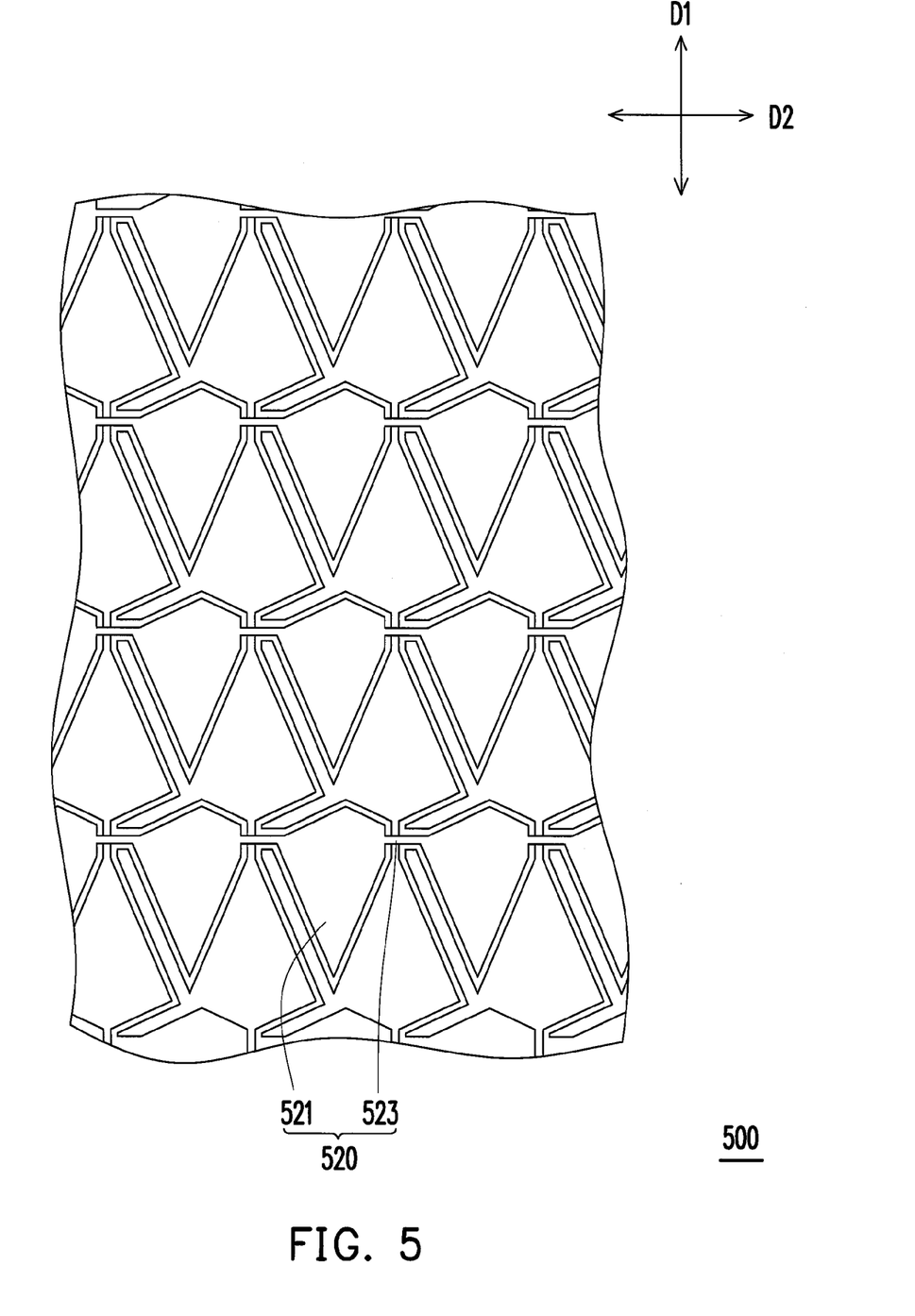
FIG. 5 illustrates a schematic top view of a portion of a capacitive touch panel according to a fourth embodiment of the invention.

Referring to FIG. 4 and FIG. 5 simultaneously, the capacitive touch panel 500 is similar to the capacitive touch panel 400 and the difference therebetween lies in that the second sensing series 520 in the capacitive touch panel 500 includes the second sensing electrodes 521 and the second connection lines 523, wherein the second sensing electrodes 521 can be served as a combination of the second sensing electrodes 421 and the adjacent third sensing electrodes 425 in the third embodiment and thus the second sensing electrodes 461 are, for example, kite-like electrodes. In addition, the second connection lines 523 can be served as a combination of the second connection lines 423 and the third connection lines 427 of the third embodiment.

Fifth Embodiment

Figure 6:
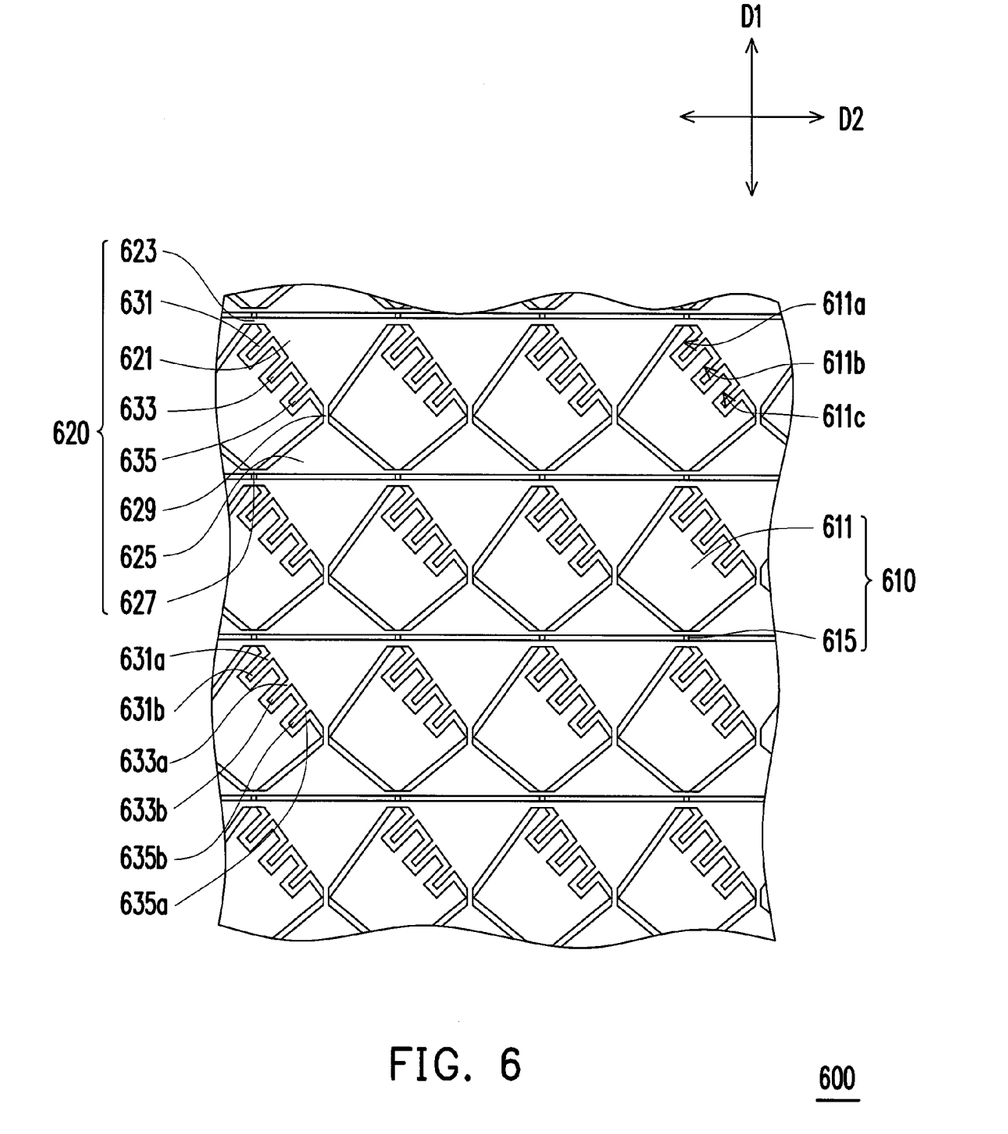
FIG. 6 illustrates a schematic top view of a portion of a capacitive touch panel according to a fifth embodiment of the invention.

Referring to FIG. 6, in the capacitive touch panel 600, the first sensing electrodes 611 in each of the first sensing series 610 are serially connected in the first direction D1 through the first connection lines 615, wherein the shapes of the first sensing electrodes 611 are, for example, quadrilateral and each of the first sensing electrodes 611 has a plurality of openings 611a, 611b, and 611c. (Herein, three openings are exemplary illustrated.) The second sensing electrodes 621 in each of the second sensing series 620 and the third sensing electrodes 625 are serially connected in the second direction D2 through the second connection lines 623, the third connection lines 627, and the fourth connection lines 629. Moreover, each of the second sensing electrodes 621 is connected with the second connection terminals 631a, 633a, and 635a of a plurality of second auxiliary electrodes 631, 633, and 635. (Herein, three second auxiliary electrodes are exemplary illustrated.) The second open terminals 631b, 633b, and 635b of the second auxiliary electrodes 631, 633, and 635 are away from the second sensing electrode 621 connected thereto. Each of the second sensing electrodes 621 is connected with the opposite third sensing electrode 625 through the corresponding fourth connection line 629. The second auxiliary electrodes 631, 633, and 635 are respectively disposed in the openings 611a, 611b, and 611c. The diagonal angles of the quadrilateral first sensing electrodes 611 can be the same or different and the lengths of the opposite edges of the quadrilateral first sensing electrodes 611 can be the same or different. In addition, the second auxiliary electrodes 631, 633, and 635 can be perpendicular to or not perpendicular to the connected second sensing electrode 621. The pattern design of the quadrilateral first sensing electrodes 611 can be modified according to the art.

Sixth Embodiment

Figure 7:
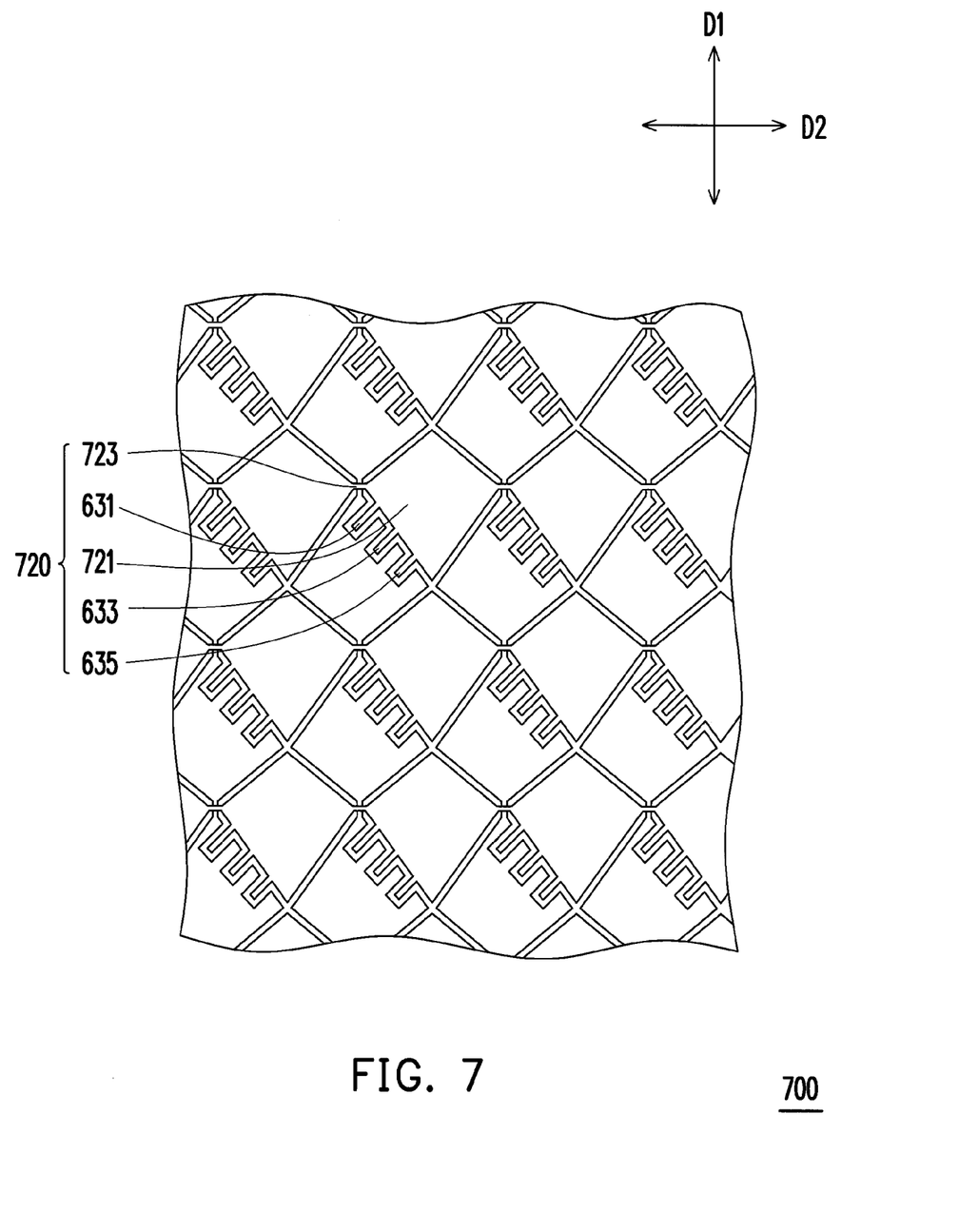
FIG. 7 illustrates a schematic top view of a portion of a capacitive touch panel according to a sixth embodiment of the invention.

Referring to FIG. 6 and FIG. 7 simultaneously, the capacitive touch panel 700 is similar to the capacitive touch panel 600 and the difference therebetween lies in that the second sensing series 720 in the capacitive touch panel 700 includes the second sensing electrodes 721, the second connection lines 720, and the second auxiliary electrodes 631, 633, and 635. The second sensing electrodes 721 can be served as a combination of the second sensing electrodes 621 and the adjacent third sensing electrodes 625 in the fifth embodiment and thus the second sensing electrodes 721 are, for example, kite-like electrodes. In addition, the second connection lines 723 can be served as a combination of the second connection lines 623 and the third connection lines 627 depicted in the fifth embodiment.

Seventh Embodiment

Figure 8:
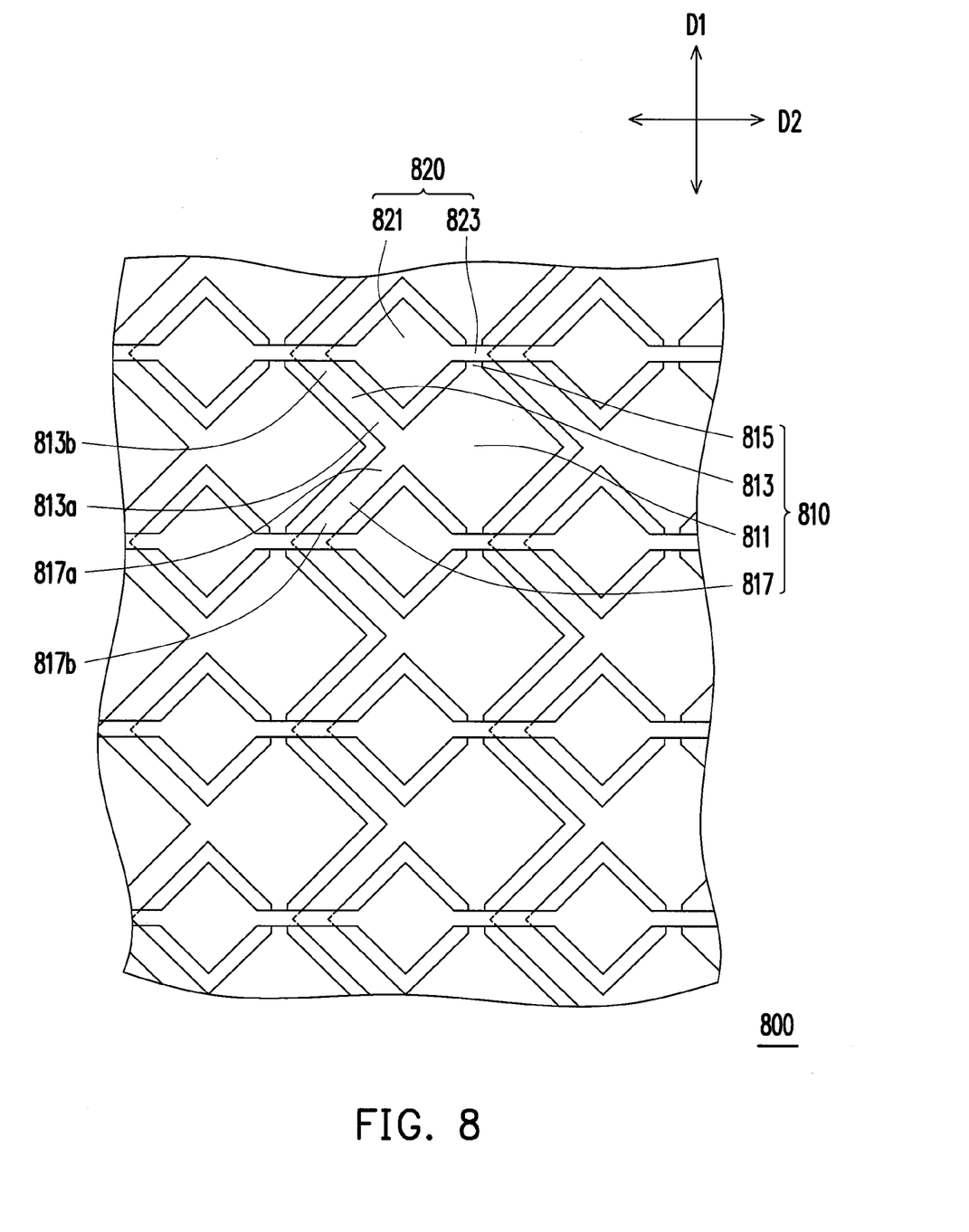
FIG. 8 illustrates a schematic top view of a portion of a capacitive touch panel according to a seventh embodiment of the invention.

Referring to FIG. 8, in the capacitive touch panel 800, the first sensing electrodes 811 of the first sensing series 810 are serially connected in the first direction D1 through a plurality of first connection lines 815. Furthermore, the first connection terminals 813a and 817a of the first auxiliary electrodes 813 and 817 are connected with the corresponding first sensing electrode 811, and the first open terminals 813b and 817b of the second auxiliary electrodes 813 and 817 are away from the connected first sensing electrode 811, wherein the first sensing electrodes 811 and the second sensing electrodes 821 are respectively formed in diamond-like shapes, the first auxiliary electrodes 813 and 817 are formed in stripe-like shapes, and the direction that the first open terminal 817b points toward is different from the direction that the first open terminal 813b points toward. The second sensing electrodes 821 of the second sensing series 820 can be serially connected in the second direction D2 through the second connection lines 823. In addition, the first open terminal 813b can be connected or not connected with the adjacent first open terminal 817b.

Eighth Embodiment

Figure 9:
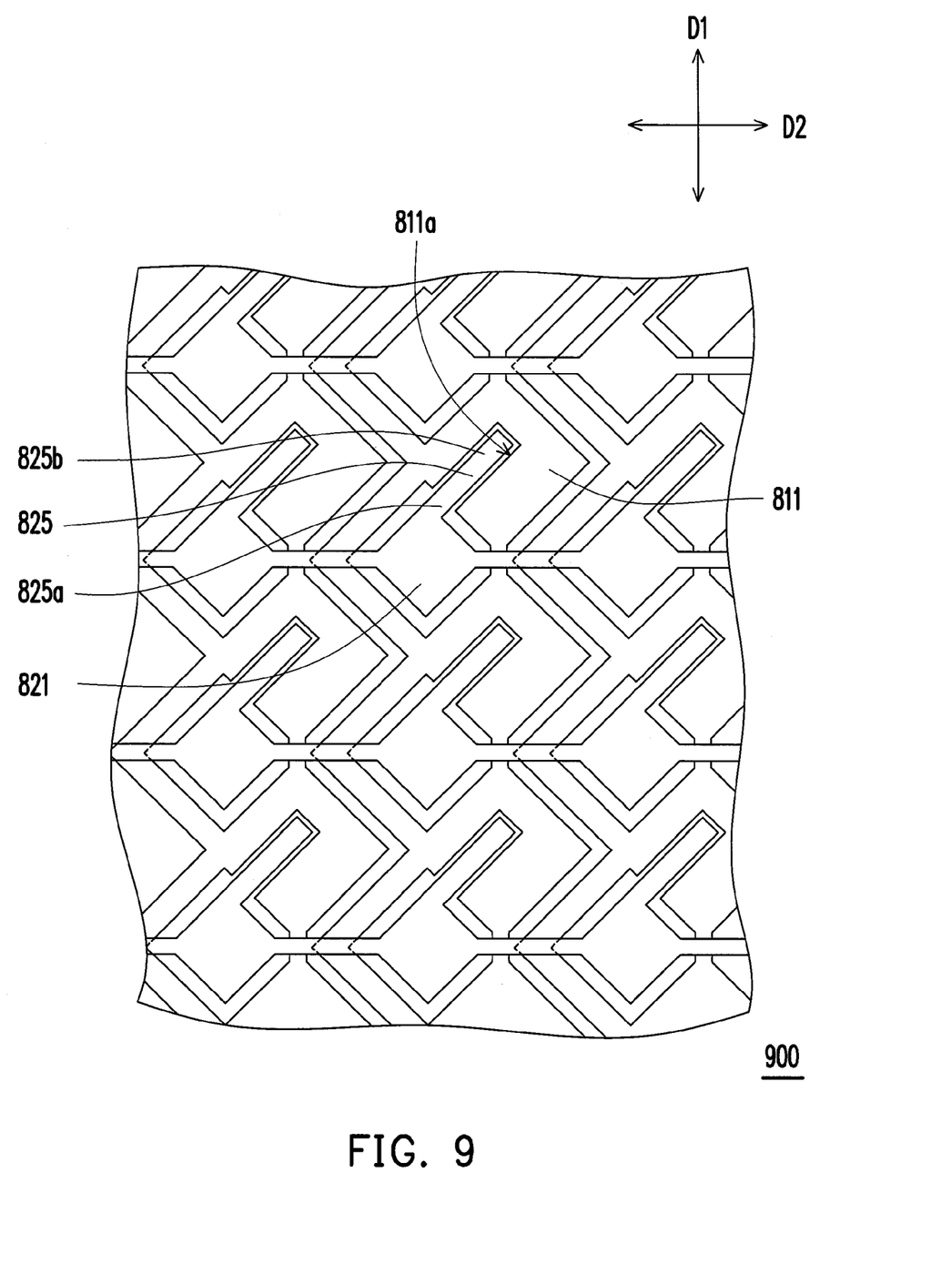
FIG. 9 illustrates a schematic top view of a portion of a capacitive touch panel according to an eighth embodiment of the invention.

Referring to FIG. 9, the capacitive touch panel 900 is similar to the capacitive touch panel 800 and the difference therebetween lies in that each of the first sensing electrodes 811 in the capacitive touch panel 900 further has an opening 811a and the second sensing series 820 includes a plurality of second auxiliary electrodes 825. The second auxiliary electrodes 825 are disposed in the openings 811a of the first sensing electrodes 811 and the second connection terminals 825a of the second auxiliary electrodes 825 are connected with the corresponding second sensing electrodes 821 while the second open terminals 825b of the second auxiliary electrodes 825 are away from the second sensing electrodes 821 connected thereto.

Ninth Embodiment

Figure 10:
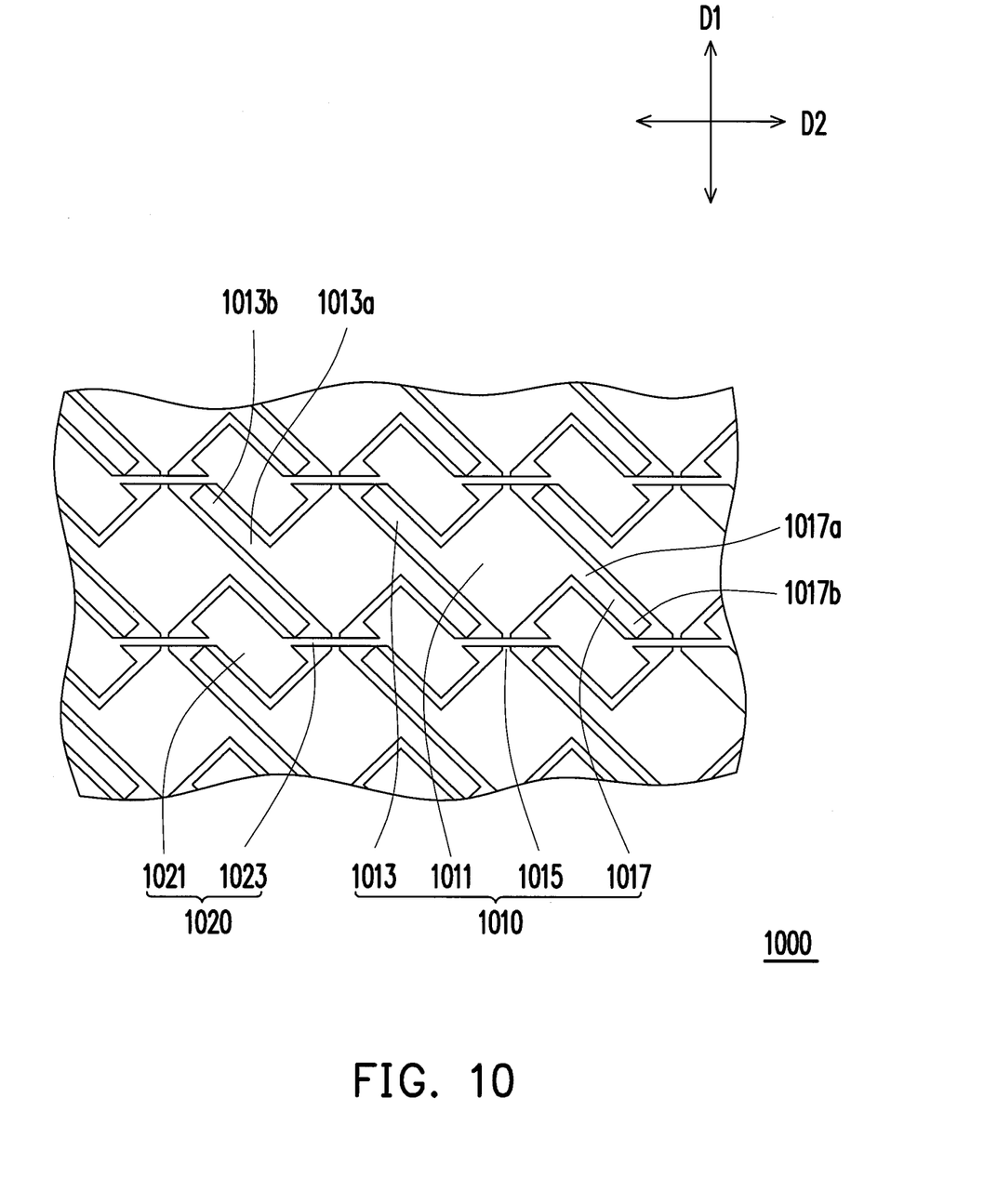
FIG. 10 illustrates a schematic top view of a portion of a capacitive touch panel according to a ninth embodiment of the invention.

Referring to FIG. 10, in the capacitive touch panel 1000, the connection relationship of the first sensing electrodes 1011, the first auxiliary electrodes 1013, and the first connection lines 1015 of each of the first sensing series 1010 can be referred to the aforesaid description of the capacitive touch panel 800 and the detail is not repeated again. The first connection terminal 1017a of each first auxiliary electrode 1017 is connected with a side of the corresponding first sensing electrodes 1011 opposite to another side of the corresponding first sensing electrodes 1011 connected with the first connection terminal 1013a. The first sensing electrodes 1011 are formed in diamond-like shapes and the first auxiliary electrodes 1013 and 1017 are formed in stripe-like shapes. The direction that the first open terminals 1017b points toward is substantially opposite to the direction that the first terminals 1013b points toward. The second sensing electrodes 1021 of each of the second sensing series 1020 are serially connected in the second direction D2 through the second connection lines 1023, wherein the shapes of the second sensing electrodes 1021 complement those of the first sensing electrodes 1011 and the first auxiliary electrodes 1013 and 1017 so that the shapes of the second sensing electrodes 1021 can be inclined rectangles.

In summary, in the capacitive touch panel according to an embodiment of the invention, at least one of the first sensing electrodes and the second sensing electrodes is connected with at least one auxiliary electrode and the open terminal of the auxiliary electrode is away from the first or second sensing electrode connected thereto. In addition, the auxiliary electrode is extended to be directly adjacent to another adjacent first or second sensing series. Accordingly, the signal values of different touch points are prevent from being identical by disposing the auxiliary electrode, which is conducive to avoid from a sensing error of the touch point.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A capacitive touch panel, comprising:
    a substrate;
    a plurality of first sensing series disposed on the substrate, each of the first sensing series extending in a first direction and comprising a plurality of first electrode units being serially connected in the first direction, each of the first electrode units comprising a first sensing electrode and a first auxiliary electrode, the first auxiliary electrode having a first connection terminal and a first open terminal opposite to the first connection terminal, the first connection terminal being connected with the first sensing electrode and the first open terminal being away from the first sensing electrode such that each of the first sensing series and each of the first electrode units are respectively asymmetrical along a central axis of the first sensing series, wherein the central axis of the first sensing series is parallel to the first direction; and
    a plurality of second sensing series disposed on the first sensing series and the substrate, each of the second sensing series extending in a second direction so as to interlace with the first sensing series and comprising a plurality of second electrode units being serially connected in the second direction, each of the second electrode units comprising a second sensing electrode, and an outer contour of each of the first electrode units is different from an outer contour of each of the second electrode units, the first sensing series and the second sensing series being electrically insulated with each other, and an edge of each of the second sensing electrodes being conformed to an edge of the adjacent first sensing series.

2. The capacitive touch panel as claimed in claim 1, wherein each of the second sensing electrodes has at least one opening and each of the first auxiliary electrodes is disposed in the at least one opening of the adjacent second sensing electrode.

3. The capacitive touch panel as claimed in claim 1, wherein each of the second sensing series further comprises a plurality of third sensing electrodes serially connected in the second direction, each of the second sensing electrodes is opposite to one of the third sensing electrodes, the second sensing electrode and the third sensing electrode opposite to each other are located between two adjacent first sensing series, and an edge of each of the third sensing electrodes is conformed to the edge of the adjacent first sensing series.

4. The capacitive touch panel as claimed in claim 3, wherein at least one of the second sensing electrodes is connected with the third sensing electrode opposite thereto.

5. The capacitive touch panel as claimed in claim 3, wherein each of the first sensing electrodes is connected with two first auxiliary electrodes and the connection terminals of the two first auxiliary electrodes are connected together while the open terminals of the two first auxiliary electrodes points toward different directions.

6. The capacitive touch panel as claimed in claim 5, wherein the adjacent open terminals of the first auxiliary electrodes in a same first sensing series are connected together.

7. The capacitive touch panel as claimed in claim 1, wherein each of the first sensing electrodes is connected with two first auxiliary electrodes and the connection terminals of the two first auxiliary electrodes are respectively connected with two opposite sides of the corresponding first sensing electrode while the two first auxiliary electrodes are not mirror symmetrical to each other.

8. The capacitive touch panel as claimed in claim 1, wherein each of the first auxiliary electrodes is adjacent to the edge of one first sensing electrode in another first sensing series.

9. The capacitive touch panel as claimed in claim 1, wherein each of the second sensing series further comprises a plurality of second auxiliary electrodes, each of the second auxiliary electrodes has a second connection terminal and a second open terminal opposite to each other, the second connection terminal is connected with one of the second sensing electrodes, and the second open terminal is away from the corresponding second sensing electrode.

10. The capacitive touch panel as claimed in claim 9, wherein each of the first sensing electrodes has at least one opening and each of the second auxiliary electrodes is disposed inside the at least one opening of the adjacent first sensing electrode.

11. The capacitive touch panel as claimed in claim 1, wherein a width of a pattern of each first sensing electrode in the second direction changes in a trend of asymmetry distribution.

12. The capacitive touch panel as claimed in claim 1, wherein each of the first sensing electrodes is connected with two first auxiliary electrodes and the connection terminals of the two first auxiliary electrodes are connected together while the open terminals of the two first auxiliary electrodes points toward different directions.

13. The capacitive touch panel as claimed in claim 12, wherein the adjacent open terminals of the first auxiliary electrodes in a same first sensing series are connected together.

\* \* \* \* \*